US008582581B2

(12) United States Patent
Kletti

(10) Patent No.: US 8,582,581 B2
(45) Date of Patent: Nov. 12, 2013

(54) DUAL-PORT ETHERNET TRAFFIC MANAGEMENT FOR PROTOCOL CONVERSION

(75) Inventor: Daniel Rian Kletti, Oak Creek, WI (US)

(73) Assignee: Cooper Technologies Company, Houston, TX (US)

(*) Notice: Subject to any disclaimer, the term of this patent is extended or adjusted under 35 U.S.C. 154(b) by 195 days.

(21) Appl. No.: 13/213,701

(22) Filed: Aug. 19, 2011

(65) Prior Publication Data
US 2012/0076156 A1 Mar. 29, 2012

Related U.S. Application Data

(60) Provisional application No. 61/387,116, filed on Sep. 28, 2010.

(51) Int. Cl.
*H04L 29/08* (2006.01)
(52) U.S. Cl.
USPC .......................... 370/395.5; 370/466; 370/469
(58) Field of Classification Search
USPC .............. 370/395.5, 395.51, 395.52, 395.53, 370/465–473
See application file for complete search history.

(56) References Cited

U.S. PATENT DOCUMENTS

| 5,682,383 | A | 10/1997 | Dahod et al. |
| 6,223,218 | B1 | 4/2001 | Iijima et al. |
| 7,606,232 | B1 | 10/2009 | Ruben et al. |
| 2003/0154298 | A1* | 8/2003 | Lu .................................. 709/230 |
| 2004/0243723 | A1* | 12/2004 | Davis et al. ..................... 709/250 |
| 2005/0002354 | A1 | 1/2005 | Kelly et al. |
| 2005/0141430 | A1* | 6/2005 | Borkowski ...................... 370/241 |
| 2005/0182854 | A1* | 8/2005 | Pinkerton et al. .............. 709/238 |
| 2005/0289181 | A1* | 12/2005 | Deninger et al. ........... 707/104.1 |
| 2006/0045106 | A1* | 3/2006 | Lee et al. ......................... 370/401 |
| 2007/0058668 | A1* | 3/2007 | Culbreth et al. ............... 370/465 |
| 2007/0165663 | A1* | 7/2007 | Aloni et al. .................... 370/420 |
| 2007/0223483 | A1* | 9/2007 | Huang et al. ................... 370/394 |
| 2007/0230475 | A1* | 10/2007 | Langner ......................... 370/394 |
| 2007/0255855 | A1 | 11/2007 | Knapp et al. |
| 2008/0205416 | A1 | 8/2008 | DeChiara |
| 2008/0240154 | A1* | 10/2008 | Oved ............................. 370/466 |
| 2008/0244117 | A1* | 10/2008 | Balassanian .................... 710/50 |
| 2008/0304481 | A1* | 12/2008 | Gurney et al. ................. 370/389 |
| 2009/0073992 | A1 | 3/2009 | Makishima et al. |
| 2011/0064086 | A1* | 3/2011 | Xiong et al. ................... 370/401 |

OTHER PUBLICATIONS

The International Search Report and Written Opinion for corresponding PCT applicaton serial No. PCT/US2011/048715, mailed Feb. 28, 2012 (13 pages).

* cited by examiner

*Primary Examiner* — Hoon J Chung
(74) *Attorney, Agent, or Firm* — King & Spalding LLP

(57) ABSTRACT

At least two communications cards are utilized to communicate with at least two Ethernet ports, each having unique MAC and IP addresses, and at least two different protocols. At least two central processing units (CPUs) are coupled to the at least two communications cards through a manageable Ethernet switch. One of the at least two CPUs is a primary (main) CPU and is capable of communicating using a limited number of native Ethernet protocols. Another one or more of the at least two CPUs is dedicated to performing conversion of additional, more complicated protocols to be sent to the primary CPU in at least one of its native Ethernet protocols. This off-loads the primary CPU from having to handle these additional, complicated protocols, thereby reducing the amount of protocol software/firmware required to be integrated with the primary CPU with a subsequent savings in boot-up time and background software overhead.

30 Claims, 6 Drawing Sheets

DUAL-PORT ETHERNET TRAFFIC MANAGEMENT FOR PROTOCOL CONVERSION

RELATED PATENT APPLICATION

This application claims priority to commonly owned U.S. Provisional Patent Application Ser. No. 61/387,116; filed Sep. 28, 2010; entitled "Dual-Port Ethernet Traffic Management for Protocol Conversion," by Daniel Rian Kletti; and is hereby incorporated by reference herein for all purposes.

TECHNICAL FIELD

The present invention relates generally to Ethernet traffic management, and more particularly, to Ethernet traffic management and protocol conversions.

BACKGROUND

Existing products process all Ethernet protocols with a single central processing unit (CPU). When additional protocol support is required, new software/firmware must be added to the operating system of the CPU. This added software/firmware for new protocols increases the boot-up time required by the CPU software/firmware and increases the overhead computational loading of the CPU, to the detriment of running applications programs.

SUMMARY

Therefore, what is needed is a way to easily add support for new Ethernet protocols without increasing a main processor's (CPU) program software/firmware overhead, and/or decrease message handling and computational efficiencies. According to the teachings of this disclosure, at least two communications cards are utilized to communicate with at least two Ethernet ports, each having unique MAC and IP addresses, and at least two different protocols. At least two central processing units (CPUs) are coupled to the at least two communications cards through a manageable Ethernet switch. One of the at least two CPUs is a primary (main) CPU and is capable of communicating using a limited number of native Ethernet protocols. Another one or more of the at least two CPUs is dedicated to performing conversion of additional, more complicated protocols to be sent to the primary CPU in at least one of its native Ethernet protocols. This off-loads the primary CPU from having to handle these additional, complicated protocols, thereby reducing the amount of protocol software/firmware required to be integrated with the primary CPU with a subsequent savings in boot-up time and background software overhead.

According to a specific example embodiment of this disclosure, an apparatus with Ethernet traffic management for protocol conversion comprises: a primary central processing unit (CPU) having first and second Ethernet interfaces; a protocol translation CPU having a third and a fourth Ethernet interface; first and second Ethernet communications interfaces; a manageable Ethernet switch having first and second ports coupled to the first and the second Ethernet interfaces of the primary CPU, respectively, third and fourth ports coupled to the third and fourth Ethernet interfaces of the protocol translation CPU, respectively, and fifth and sixth ports coupled to the first and second Ethernet communications interfaces, respectively; wherein Ethernet traffic having a protocol recognized by the primary CPU is routed between the first or second Ethernet communications interfaces and the first or second Ethernet interfaces of the primary CPU by the manageable Ethernet switch, and Ethernet traffic not having a protocol recognized by the primary CPU is routed between the first or second Ethernet communications interfaces and the protocol translation CPU by the manageable Ethernet switch, whereby the protocol translation CPU converts the Ethernet traffic having the unrecognized protocol to Ethernet traffic having the recognized protocol and then sending the recognized protocol converted Ethernet traffic to the primary CPU.

According to another specific example embodiment of this disclosure, an apparatus with Ethernet traffic management for protocol conversion comprises: a primary central processing unit (CPU) having first and second Ethernet interfaces; a protocol translation CPU having third and fourth Ethernet interfaces; first and second Ethernet communications interfaces; an analog switch having first and second positions, wherein a common of the analog switch is coupled to the first Ethernet communications interface; a manageable Ethernet switch having a first port coupled to the first Ethernet interface of the primary CPU, a second port coupled to the second Ethernet interface of the primary CPU, third and fourth ports coupled to the third and fourth Ethernet interfaces of the protocol translation CPU, respectively, a sixth port coupled to the second Ethernet communications interface, a fifth port coupled to the first position of the analog switch, and a seventh port coupled to the second position of the analog switch; wherein Ethernet traffic having a protocol recognized by the primary CPU is routed between the second Ethernet communications interface and the first Ethernet interface of the primary CPU by the manageable Ethernet switch when the analog switch is the first position, Ethernet traffic not having a protocol recognized by the primary CPU is routed between the second Ethernet communications interface and the protocol translation CPU by the manageable Ethernet switch, whereby the protocol translation CPU converts the Ethernet traffic having the unrecognized protocol to Ethernet traffic having the recognized protocol and then sending the recognized protocol converted Ethernet traffic to the primary CPU over the first Ethernet interface; and the first Ethernet communications interface is coupled to the fifth port of the manageable Ethernet switch when the analog switch is in the first position and to the seventh port of the manageable Ethernet switch when the analog switch is in the second position.

According to yet another specific example embodiment of this disclosure, a method for Ethernet traffic management and protocol conversion comprises the steps of: coupling first and second Ethernet communications interfaces to a manageable Ethernet switch; determining with the manageable Ethernet switch whether Ethernet traffic from the first or the second Ethernet communications interfaces has a protocol recognized by a primary CPU; routing the Ethernet traffic having the protocol recognized by the primary CPU to the primary CPU with the manageable Ethernet switch; routing the Ethernet traffic not having the protocol recognized by the primary CPU to a protocol translation CPU for translating the unrecognized protocol to the protocol recognized by the primary CPU with the manageable Ethernet switch; and routing translated Ethernet traffic from the protocol translation CPU to the primary CPU with the manageable Ethernet switch.

BRIEF DESCRIPTION OF THE DRAWINGS

For a more complete understanding of the present invention and the advantages thereof, reference is now made to the following description, in conjunction with the accompanying drawings briefly described as follows.

Figure 1:
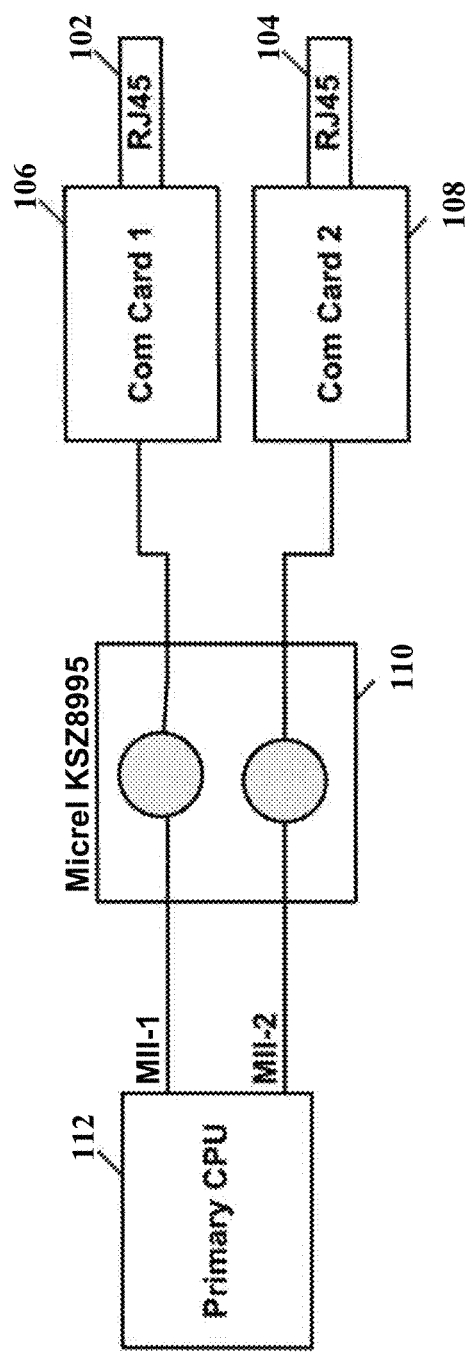
FIG. 1 illustrates a schematic block diagram of a single primary central processing unit (CPU) having two Ethernet interfaces coupled through a manageable Ethernet switch to two communications cards for interfacing with two Ethernet ports.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, details of example embodiments of the present invention are schematically illustrated. Like elements in the drawings will be represented by like numbers, and similar elements will be represented by like numbers with a different lower case letter suffix.

Referring to FIG. 1, depicted is a schematic block diagram of a single primary central processing unit (CPU) having two Ethernet interfaces coupled through a manageable Ethernet switch to two communications cards for interfacing with two Ethernet ports. The Ethernet interface may be, for example but is not limited to, a media independent interface (MIT), a 4-wire interface, a reduced media independent interface (RMII), a gigabit media independent interface (GMII), etc. All Ethernet traffic on ports 102 and 104 passes through the respective communications cards 106 and 108, through the manageable Ethernet switch 110 having virtual local area network (VLAN) capabilities and port forwarding support, and then to the primary CPU 112 over Ethernet interfaces MII-1 and MII-2 buses. The primary CPU 112 is the only processor and it must handle all types of protocols coming over the MII-1 and MII-2 buses from the Ethernet ports 102 and 104. This configuration requires a lot of software overhead and processing power for the one primary CPU 112 to handle all types of Ethernet communications while running applications programs. Each of the communications cards 106 and 108 may have its own unique media access controller (MAC) address and Internet protocol (IP) address.

Figure 2:
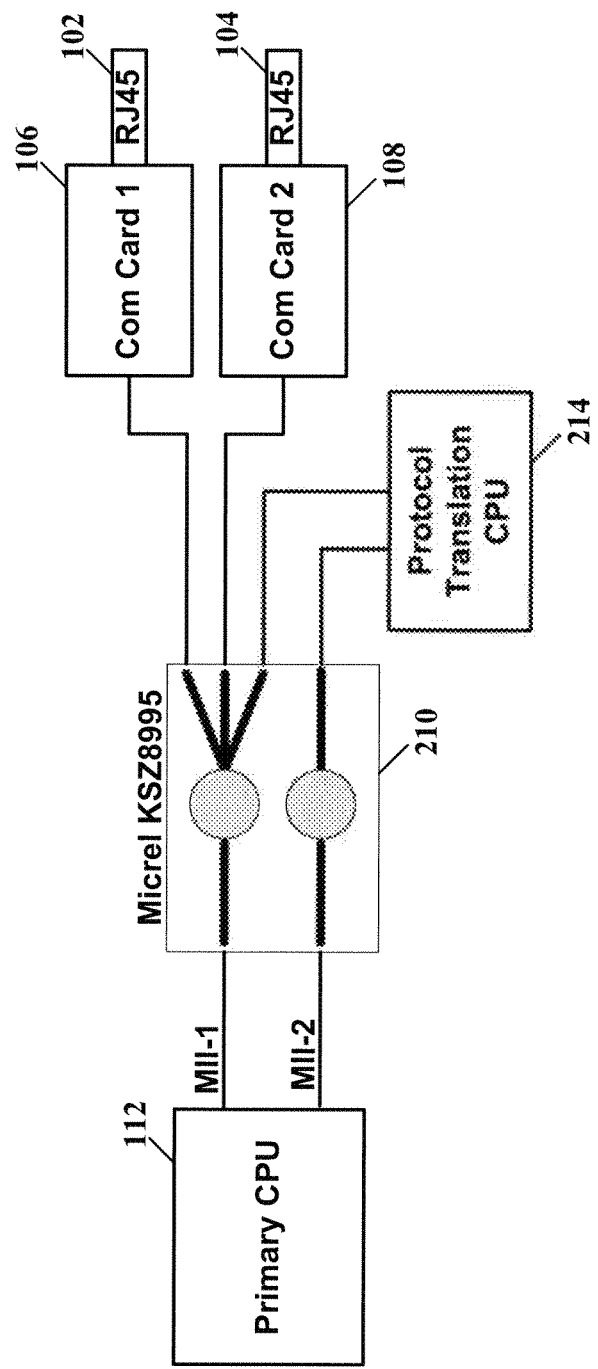
FIG. 2 illustrates a schematic block diagram of a primary central processing unit (CPU) having two Ethernet interfaces and a protocol translation CPU coupled through a manageable Ethernet switch to two communications cards for interfacing with two Ethernet ports.

Referring to FIG. 2, depicted is a schematic block diagram of a primary central processing unit (CPU) having two Ethernet interfaces, and a protocol translation CPU coupled through a manageable Ethernet switch to two communications cards for interfacing with two Ethernet ports. Traffic (data) from either one or both of the communications cards 106 and 108 can go either to the primary CPU 112 or to the protocol translation CPU 214, however, the primary CPU 112 is limited to accepting data from the communications cards 106 and 108 at only one MAC/IP address of the MII-1 bus. The protocol translation CPU 214 can communicate with the primary CPU 112 over the MII-2 bus using a different MAC/IP address.

The manageable Ethernet switch 210 may be programmed to allow traffic having a standard protocol recognized by the primary CPU 112 to go directly to the primary CPU 112, and traffic having protocols not recognized by the primary CPU 112 to go directly to the protocol translation CPU 214. The manageable Ethernet switch 210 may also be programmed to have virtual local area networks (VLANs) so that the traffic having protocols translated through the protocol translation CPU 214 may be directed over the MII-1 bus to the primary CPU 112, and/or directly through the manageable Ethernet switch 210 over the MII-2 bus. Thus, the primary CPU 112 can communicate over the MII-1 bus, using its native protocols to either one of the communications cards 106 and 108, but at only one IP and/or MAC address. The non-native protocol traffic (data) must first go through and be translated by the protocol translation CPU 214 before being recognized by the primary CPU 112 over the MII-2 bus. If the protocol translation CPU 214 is not installed or is inactive, the primary CPU 112 can communicate using only one communications channel over the MII-1 bus to the communications cards 106 and 108.

Figure 3:
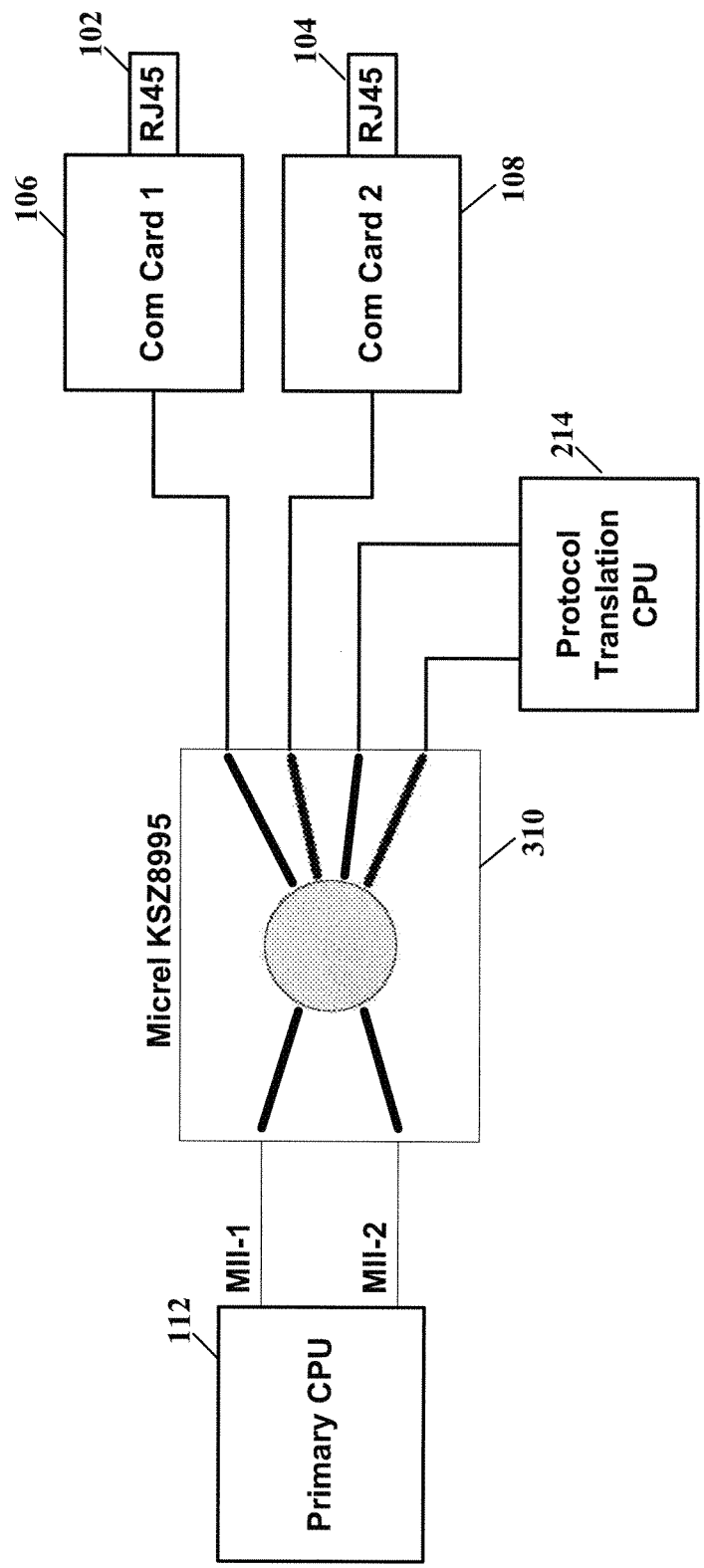
FIG. 3 illustrates a schematic block diagram of a primary central processing unit (CPU) having two Ethernet interfaces and a protocol translation CPU coupled through a manageable Ethernet switch to two communications cards for interfacing with two Ethernet ports, according to a specific example embodiment of this disclosure.

Referring to FIG. 3, depicted is a schematic block diagram of a primary central processing unit (CPU) having two Ethernet interfaces and a protocol translation CPU coupled through a manageable Ethernet switch to two communications cards for interfacing with two Ethernet ports, according to a specific example embodiment of this disclosure. Traffic (data) from either one or both of the communications cards 106 and 108 can go either to the primary CPU 112 or to the protocol translation CPU 214. The manageable Ethernet switch 210 may be programmed to allow traffic having a standard protocol recognized by the primary CPU 112 to go directly to the primary CPU 112, and traffic having protocols not recognized by the primary CPU 112 to go directly to the protocol translation CPU 214. The manageable Ethernet switch 310 may also be programmed to have virtual local area networks (VLANs) so that the traffic having protocols translated through the protocol translation CPU 214 may be redirected over the MII-1 or MII-2 buses to the primary CPU 112. When traffic having a native protocol is received, this traffic can pass through the manageable Ethernet switch 310 over either one or both of the MII-1 and MII-2 buses directly to the primary CPU 112. The non-native protocol traffic (data) must first go through and be translated by the protocol translation CPU 214 before being recognized by the primary CPU 112 over either of the MII-1 and MII-2 buses. If the protocol translation CPU 214 is not installed or is inactive, the primary CPU 112 can communicate over both of the MII-1 and MII-2 buses and the communications cards 106 and 108 may have unique MAC and IP addresses. With the protocol translation CPU 214 active, traffic (data) can go to either the primary CPU 112 and/or the protocol translation CPU 214, and the communications cards 106 and 108 may have unique MAC and IP addresses.

Figure 4:
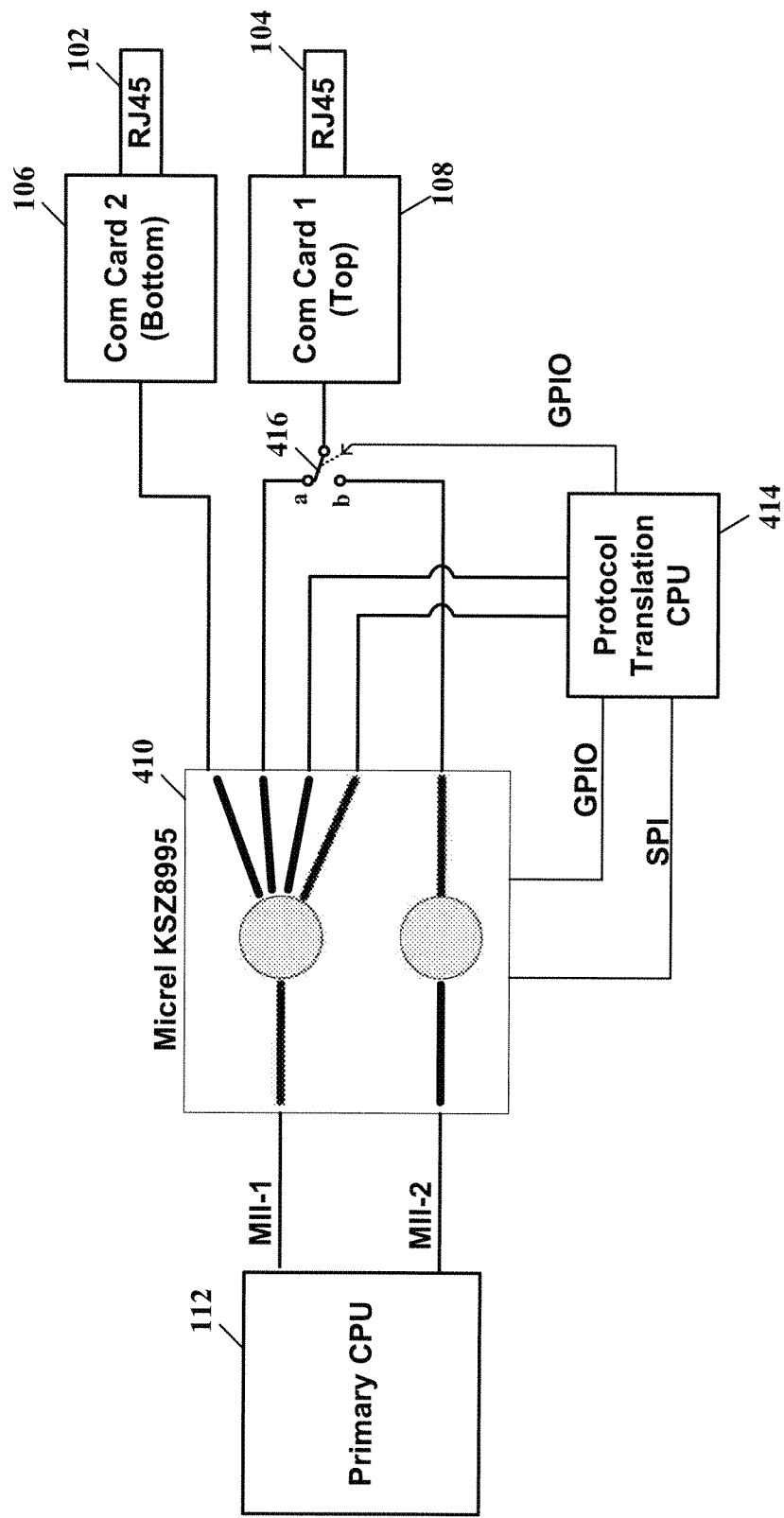
FIG. 4 illustrates a schematic block diagram of a primary central processing unit (CPU) having two Ethernet interfaces and a protocol translation CPU coupled through a manageable Ethernet switch to two communications cards for interfacing with two Ethernet ports and an analog switch, according to another specific example embodiment of this disclosure.

Referring to FIG. 4, depicted is a schematic block diagram of a primary central processing unit (CPU) having two Ethernet interfaces and a protocol translation CPU coupled through a manageable Ethernet switch to two communications cards for interfacing with two Ethernet ports and an analog switch, according to another specific example embodiment of this disclosure. Traffic (data) from the communication card 106 can go directly to the primary CPU 112 over the MII-1 bus, or to the protocol translation CPU 414. Traffic (data) from the communication card 108 can go directly to the primary CPU 112 over the MII-1 bus, or to the protocol translation CPU 414 when analog switch 416 is in position "a." Traffic (data) from the communication card 108 can only go to the primary CPU 112 over the MII-2 bus when analog switch 416 is in position "b." This is helpful in providing for the low latency requirements of IEC61850 GOOSE (hereinafter "GOOSE") messaging when used and the protocol translation CPU 414 is active.

The manageable Ethernet switch 410 may be programmed to allow traffic having a standard protocol recognized by the primary CPU 112 to go directly to the primary CPU 112 over the MII-1 bus, and traffic having protocols not recognized by the primary CPU 112 to go directly to the protocol translation CPU 414. The 5-port manageable Ethernet switch 410 may also be programmed to have virtual local area networks (VLANs) so that the traffic having protocols translated through the protocol translation CPU 414 may be redirected over the MII-1 bus to the primary CPU 112. When traffic having a native protocol is received, this traffic may pass through the manageable Ethernet switch 410 over the MII-1 bus directly to the primary CPU 112. The non-native protocol traffic (data) must first go through and be translated by the protocol translation CPU 414 before being recognized by the primary CPU 112 over the MII-1 bus. If the protocol translation CPU 414 is not installed or is inactive, the primary CPU 112 can communicate over both of the MII-1 and MII-2 buses and the communications cards 106 and 108 may have unique MAC and IP addresses when the switch is in position "b." With the protocol translation CPU 414 active, traffic (data) can go to either the primary CPU 112 and/or the protocol translation CPU 414, and the communications cards 106 and 108 may have unique MAC and IP addresses.

Both MII-1 and MII-2 buses are used for communications with the communications cards 106 and 108 when the protocol translation CPU 414 is not installed. Thus, there are two separate MAC addresses and therefore two separate IP addresses for use with the two communications cards 106 and 108. However only one MII-1 interface is used by the primary CPU 112 when the protocol translation CPU 414 is installed, but all traffic from both of the communications cards 106 and 108 may be routed first to the protocol translation CPU 414. The protocol translation CPU 414 controls the 5-port manageable Ethernet switch 410 via e.g., SPI, and can block access from the communications cards 106 and 108 to MII-1 bus and primary CPU 112. If GOOSE messaging is used, then the analog switch 416 can be toggled to route the GOOSE message on the communications card 108 directly back over the MII-2 bus to the primary CPU 112. The analog switch 416 may be controlled by the protocol translation CPU 414 via a general purpose input-out (GPIO) control interface, as can be the 5-port manageable Ethernet switch 410.

Figure 5:
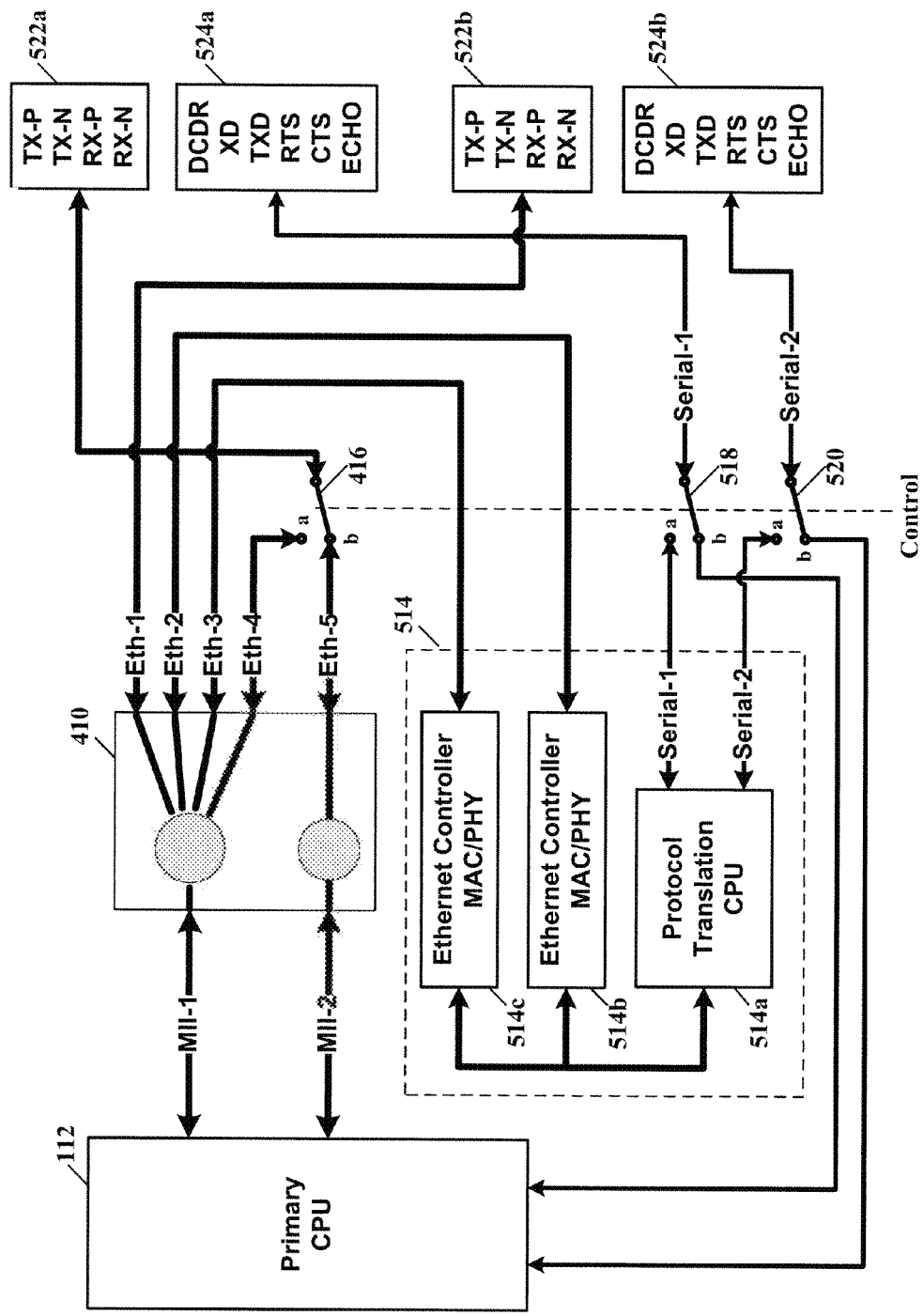
FIG. 5 illustrates a schematic block diagram of a primary central processing unit (CPU), a protocol translation CPU, a manageable Ethernet switch, and Ethernet and serial analog switches coupled to two Ethernet and two serial communications interface connectors adapted for coupling to a variety of Ethernet and serial interfaces, according to yet another specific example embodiment of this disclosure.

Referring to FIG. 5, depicted is a schematic block diagram of a primary central processing unit (CPU), a protocol translation CPU, a manageable Ethernet switch, and Ethernet and serial analog switches coupled to two Ethernet and two serial communications interface connectors adapted for coupling to a variety of Ethernet and serial interfaces, according to yet another specific example embodiment of this disclosure. Traffic (data) from the Ethernet communication connector 522*a* can go directly to the primary CPU 112 over the MII-1 bus, or to the protocol translation CPU 514. Traffic (data) from the Ethernet communication connector 522*b* can go directly to the primary CPU 112 over the MII-1 bus, or to the protocol translation CPU 514 when analog switch 416 is in position "a." Traffic (data) from the Ethernet communication connector 522*a* can only go to the primary CPU 112 over the MII-2 bus when analog switch 416 is in position "b." This is useful when GOOSE messaging is used and the protocol translation CPU 514 is active.

The manageable Ethernet switch 410 may be programmed to allow traffic having a standard protocol recognized by the primary CPU 112 to go directly to the primary CPU 112 over the MII-1 bus, and traffic having protocols not recognized by the primary CPU 112 to go directly to the protocol translation CPU 514. The 5-port manageable Ethernet switch 410 may also be programmed to have virtual local area networks (VLANs) so that the traffic having protocols translated through the protocol translation CPU 514 may be redirected over the MII-1 bus to the primary CPU 112. When traffic having a native protocol is received, this traffic may pass through the manageable Ethernet switch 410 over the MII-1 bus directly to the primary CPU 112. The non-native protocol traffic (data) must first go through and be translated by the protocol translation CPU 514 before being recognized by the primary CPU 112 over the MII-1 bus. If the protocol translation CPU 514 is not installed or is inactive, the primary CPU 112 can communicate over the MII-1 and MII-2 buses to the Ethernet communication connector 522*a* and the Ethernet communication connector 522*b*, respectively, and may have unique MAC and IP addresses when the switch is in position "b." With the protocol translation CPU 514 active, traffic (data) can go to either the primary CPU 112 and/or the protocol translation CPU 514, and the Ethernet communication connector 522*a* and the Ethernet communication connector 522*b* each may have unique MAC and IP addresses.

Both MII-1 and MII-2 buses are used for communications with the Ethernet communication connector 522*a* and the Ethernet communication connector 522*b* when the protocol translation CPU 414 is not installed. Thus, there are two separate MAC addresses and therefore two separate IP addresses for use with the Ethernet communication connector 522*a* and the Ethernet communication connector 522*b*. However only one MII-1 interface is used by the primary CPU 112 when the protocol translation CPU 514 is installed, but all traffic from both of the Ethernet communication connector 522*a* and the Ethernet communication connector 522*b* may be routed first to the protocol translation CPU 514. The protocol translation CPU 514 may control the 5-port manageable Ethernet switch 410 via e.g., SPI, GPIO, etc., and can block access from the Ethernet communication connector 522*a* and the Ethernet communication connector 522*b* to MII-1 bus and primary CPU 112. If GOOSE messaging is used, then the analog switch 416 can be toggled to route the GOOSE message on the Ethernet communication connector 522*a* directly back over the MII-2 bus to the primary CPU 112. The analog switch 416 may be controlled by the protocol translation CPU 514 and/or the primary CPU 112 via a SPI, or general purpose input-out (GPIO) control interface, as can the 5-port manageable Ethernet switch 410.

Serial interfaces of the primary CPU 112 and the protocol translation CPU 514 may be independently switched between the serial communications connectors 524a and 524b with serial switches 518 and 520. When switch 518 is in position "a" the serial communications connector 524a is coupled to the protocol translation CPU 514, and when in position "b" the serial communications connector 524a is coupled to the primary CPU 112. Likewise, when switch 520 is in position "a" the serial communications connector 524b is coupled to the protocol translation CPU 514, and when in position "b" the serial communications connector 524b is coupled to the primary CPU 112.

Figure 6:
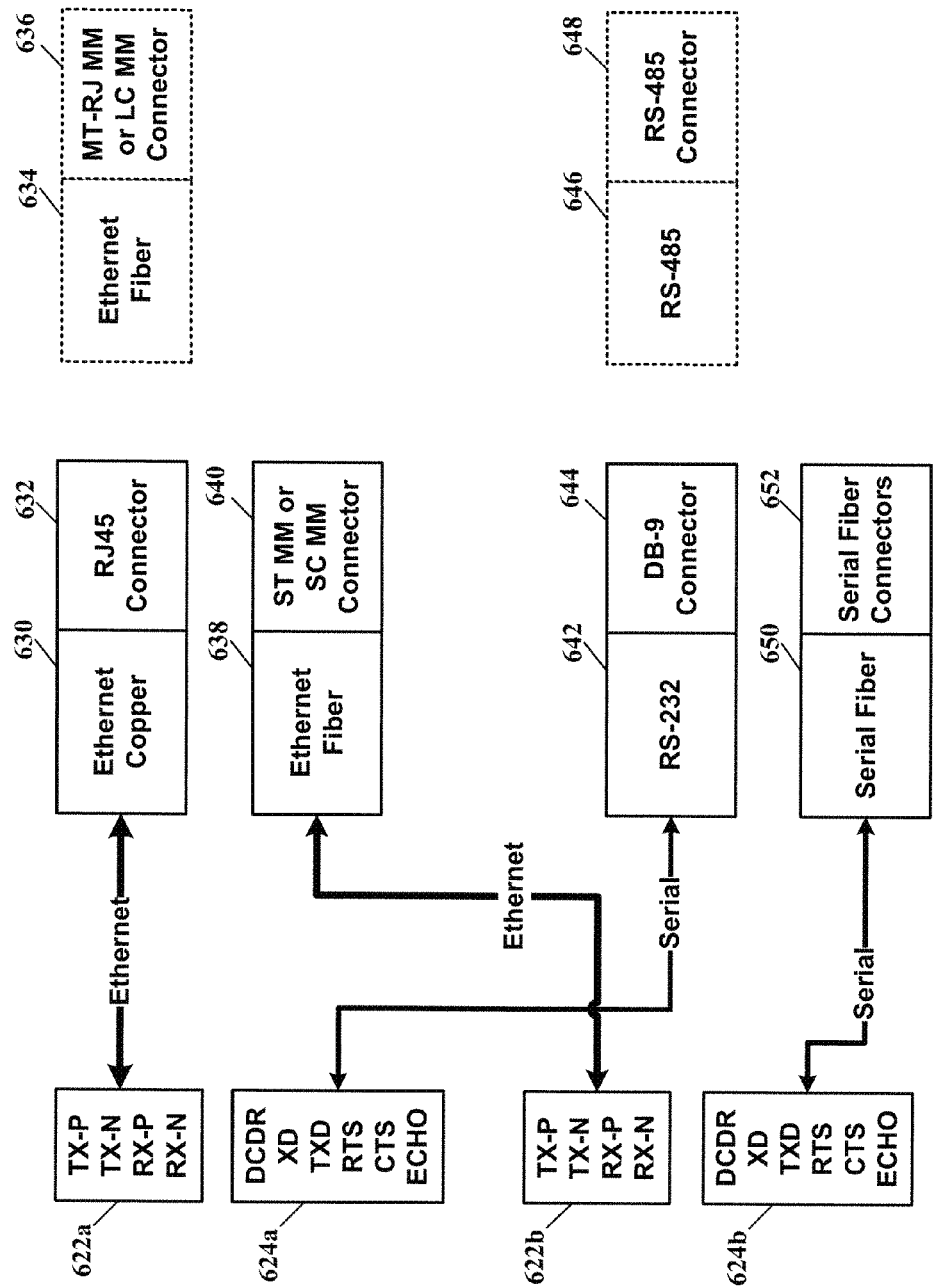
FIG. 6 illustrates schematic block diagrams of various types of Ethernet and serial interfaces compatible with the two Ethernet and two serial communications interface connectors shown in FIG. 5, according to the specific example embodiments of this disclosure.

Referring to FIG. 6, depicted are schematic block diagrams of various types of Ethernet and serial interfaces compatible with the two Ethernet and two serial communications interface connectors shown in FIG. 5, according to the specific example embodiments of this disclosure. Various types of Ethernet and serial interfaces may be used with the primary CPU 112 and the protocol translation CPU 514 by using desired Ethernet and serial interfaces that have compatible Ethernet communications connectors 622 and serial communications connectors 624 adapted to mate with the Ethernet communications connectors 522 and the serial communications connectors 524, respectively, shown in FIG. 5.

A copper wire Ethernet interface 630 may be coupled to the Ethernet communications connector 622a or 622b, and an RJ45 Ethernet connector 632. This interface allows direct wire connection to a wired local area network (LAN) or Internet modem, e.g., cable, DSL, etc. A glass fiber (fiber optic) Ethernet interface 634 may be coupled to the Ethernet communications connector 622a or 622b, and a fiber optic Ethernet transceiver having either a MT-RJ MM or LC SM connector 636 for coupling to a glass fiber communications cable (not shown). A glass fiber (fiber optic) Ethernet interface 638 may be coupled to the Ethernet communications connector 622a or 622b, and a fiber optic Ethernet transceiver having either a ST MM or SC MM connector 640 for coupling to a glass fiber communications cable (not shown).

An RS-232 serial communications interface 642 may be coupled to the serial communications connector 624a or 624b, and a DB-9 connector 644. An RS-485 serial communications interface 646 may be coupled to the serial communications connector 624a or 624b, and a compatible RS-485 connector 648. A serial fiber communications interface 650 may be coupled to the serial communications connector 624a or 624b, and a compatible serial fiber connector 652. It is contemplated and within the scope of this disclosure other communications interfaces may also be effectively used with the invention disclosed herein. One having ordinary skill in digital communications and the benefit of this disclosure would readily understand how to apply these other communications interfaces.

It is contemplated and within the scope of this disclosure that more than two communications cards may be used as well as providing more ports on the manageable Ethernet switch 410 for the additional communications cards used in combination with a manageable Ethernet switch, a primary CPU and a protocol translation CPU.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

I claim:

1. An apparatus with Ethernet traffic management for protocol conversion, said apparatus comprising:
   a primary central processing unit (CPU) having first and second Ethernet interfaces;
   a protocol translation CPU having third and fourth Ethernet interfaces;
   first and second Ethernet communications interfaces;
   a manageable Ethernet switch having
      first and second ports coupled to the first and second Ethernet interfaces of the primary CPU, respectively,
      third and fourth ports coupled to the third and fourth Ethernet interfaces of the protocol translation CPU, respectively, and
      fifth and sixth ports coupled to the first and second Ethernet communications interfaces, respectively;
   wherein
      Ethernet traffic having a protocol recognized by the primary CPU is routed between the first or second Ethernet communications interfaces and the first or second Ethernet interfaces of the primary CPU by the manageable Ethernet switch, and
      Ethernet traffic not having a protocol recognized by the primary CPU is routed between the first or second Ethernet communications interfaces and the protocol translation CPU by the manageable Ethernet switch, whereby the protocol translation CPU converts the Ethernet traffic having the unrecognized protocol to Ethernet traffic having the recognized protocol and then sending the recognized protocol converted Ethernet traffic to the primary CPU.

2. The apparatus according to claim 1, wherein any one or more of the first, second, third and fourth Ethernet interfaces is selected from the group consisting of a media independent interface (MII), a 4-wire interface, a reduced media independent interface (RMII), and a gigabit media independent interface (GMII).

3. The apparatus according to claim 1, wherein the first Ethernet communications interface is a wired Ethernet interface having an RJ45 connector.

4. The apparatus according to claim 1, wherein the second Ethernet communications interface is a wired Ethernet interface having an RJ45 connector.

5. The apparatus according to claim 1, wherein the first Ethernet communications interface is a fiber optic Ethernet interface having a connector adapted for coupling to a fiber optic cable.

6. The apparatus according to claim 1, wherein the second Ethernet communications interface is a fiber optic Ethernet interface having a connector adapted for coupling to a fiber optic cable.

7. The apparatus according to claim 1, wherein the first and second Ethernet communications interfaces have unique MAC and IP addresses.

8. The apparatus according to claim 1, wherein the first, second, third and fourth Ethernet interfaces have unique MAC and IP addresses.

9. The apparatus according to claim 1, further comprising first and second Ethernet communications connectors between the first and second ports of the manageable Ethernet switch and the first and second Ethernet communications interfaces, respectively.

10. The apparatus according to claim 9, wherein the first and second Ethernet communications interfaces are interchangeable and selected from the group consisting of a wired Ethernet interface having an RJ45 connector and a fiber optic Ethernet interface having a connector adapted for coupling to a fiber optic cable.

11. An apparatus with Ethernet traffic management for protocol conversion, said apparatus comprising:
   a primary central processing unit (CPU) having first and second Ethernet interfaces;
   a protocol translation CPU having third and fourth Ethernet interfaces;
   first and second Ethernet communications interfaces;
   an analog switch having first and second positions, wherein a common of the analog switch is coupled to the first Ethernet communications interface;
   a manageable Ethernet switch having
      a first port coupled to the first Ethernet interface of the primary CPU,
      a second port coupled to the second Ethernet interface of the primary CPU,
      third and fourth ports coupled to the third and fourth Ethernet interfaces of the protocol translation CPU, respectively,
      a sixth port coupled to the second Ethernet communications interface,
      a fifth port coupled to the first position of the analog switch, and
      a seventh port coupled to the second position of the analog switch;
   wherein
      Ethernet traffic having a protocol recognized by the primary CPU is routed between the second Ethernet communications interface and the first Ethernet interface of the primary CPU by the manageable Ethernet switch when the analog switch is in the first position,
      Ethernet traffic not having a protocol recognized by the primary CPU is routed between the second Ethernet communications interface and the protocol translation CPU by the manageable Ethernet switch, whereby the protocol translation CPU converts the Ethernet traffic having the unrecognized protocol to Ethernet traffic having the recognized protocol and then sending the recognized protocol converted Ethernet traffic to the primary CPU over the first Ethernet interface; and
      the first Ethernet communications interface is coupled to the fifth port of the manageable Ethernet switch when the analog switch is in the first position and to the seventh port of the manageable Ethernet switch when the analog switch is in the second position.

12. The apparatus according to claim 11, wherein when the analog switch is in the second position the first Ethernet communications interface is coupled to the second Ethernet interface of the primary CPU through the manageable Ethernet switch.

13. The apparatus according to claim 12, wherein the first Ethernet communications interface is coupled to the second Ethernet interface of the primary CPU for IEC61850 GOOSE messaging.

14. The apparatus according to claim 13, wherein the first and second Ethernet communications interfaces are interchangeable and selected from the group consisting of a wired Ethernet interface having an RJ45 connector and a fiber optic Ethernet interface having a connector adapted for coupling to a fiber optic cable.

15. The apparatus according to claim 11, wherein the protocol translation CPU controls the analog switch.

16. The apparatus according to claim 11, wherein the primary CPU controls the analog switch.

17. The apparatus according to claim 11, wherein any one or more of the first, second, third and fourth Ethernet interfaces is selected from the group consisting of a media independent interface (MII), a 4-wire interface, a reduced media independent interface (RMII), and a gigabit media independent interface (GMII).

18. The apparatus according to claim 11, wherein the first Ethernet communications interface is a wired Ethernet interface having an RJ45 connector.

19. The apparatus according to claim 11, wherein the second Ethernet communications interface is a wired Ethernet interface having an RJ45 connector.

20. The apparatus according to claim 11, wherein the first Ethernet communications interface is a fiber optic Ethernet interface having a connector adapted for coupling to a fiber optic cable.

21. The apparatus according to claim 11, wherein the second Ethernet communications interface is a fiber optic Ethernet interface having a connector adapted for coupling to a fiber optic cable.

22. The apparatus according to claim 11, wherein the first and second Ethernet communications interfaces have unique MAC and IP addresses.

23. The apparatus according to claim 11, wherein the first, second, third and fourth Ethernet interfaces have unique MAC and IP addresses.

24. The apparatus according to claim 11, further comprising first and second Ethernet communications connectors between the first and second ports of the manageable Ethernet switch and the first and second Ethernet communications interfaces, respectively.

25. The apparatus according to claim 11, further comprising at least one serial communications switch coupled between at least one serial communications interface, and at least one serial communications port of the primary CPU and the protocol translation CPU, wherein the at least one serial communications switch couples the at least one serial communications interface to either the at least one serial communications port of the primary CPU or the at least one serial communications port of the protocol translation CPU.

26. A method for Ethernet traffic management and protocol conversion, said method comprising the steps of:
   coupling first and second Ethernet communications interfaces to a manageable Ethernet switch;
   determining with the manageable Ethernet switch whether Ethernet traffic from the first or the second Ethernet communications interfaces has a protocol recognized by a primary CPU;
   routing the Ethernet traffic having the protocol recognized by the primary CPU to the primary CPU with the manageable Ethernet switch;
   routing the Ethernet traffic not having the protocol recognized by the primary CPU to a protocol translation CPU for translating the unrecognized protocol to the protocol recognized by the primary CPU with the manageable Ethernet switch; and
   routing the translated Ethernet traffic from the protocol translation CPU to the primary CPU with the manageable Ethernet switch.

27. The method according to claim 26, further comprising the primary CPU having two ports coupled to first and second ports of the manageable Ethernet switch, wherein the two ports of the primary CPU have unique MAC and IP addresses.

28. The method according to claim 27, further comprising the protocol translation CPU having two ports coupled to third and fourth ports of the manageable Ethernet switch, wherein the two ports of the protocol translation CPU have unique MAC and IP addresses.

29. The method according to claim 28, wherein the first Ethernet communications interface is coupled to a fifth port of the manageable Ethernet switch, and the second Ethernet communications interface is coupled to a sixth port of the manageable Ethernet switch.

30. The method according to claim 29, further comprising the step of:
   switching the first Ethernet communications interface between the fifth port of the manageable Ethernet switch and a seventh port of the manageable Ethernet switch, wherein
      when the first Ethernet communications interface is coupled to the fifth port of the manageable Ethernet switch the Ethernet traffic from the first Ethernet communications interface is coupled to one of the two ports of the primary CPU or to one of the two ports of the protocol translation CPU, and
      when the first Ethernet communications interface is coupled to the seventh port of the manageable Ethernet switch the Ethernet traffic from the first Ethernet communications interface is coupled to the other one of the two ports of the primary CPU only.

* * * * *